July 28, 1959 C. W. BAUGH, JR 2,897,360
COLOR TELEVISION SYNCHRONOUS DEMODULATOR CIRCUIT
Filed Aug. 17, 1955
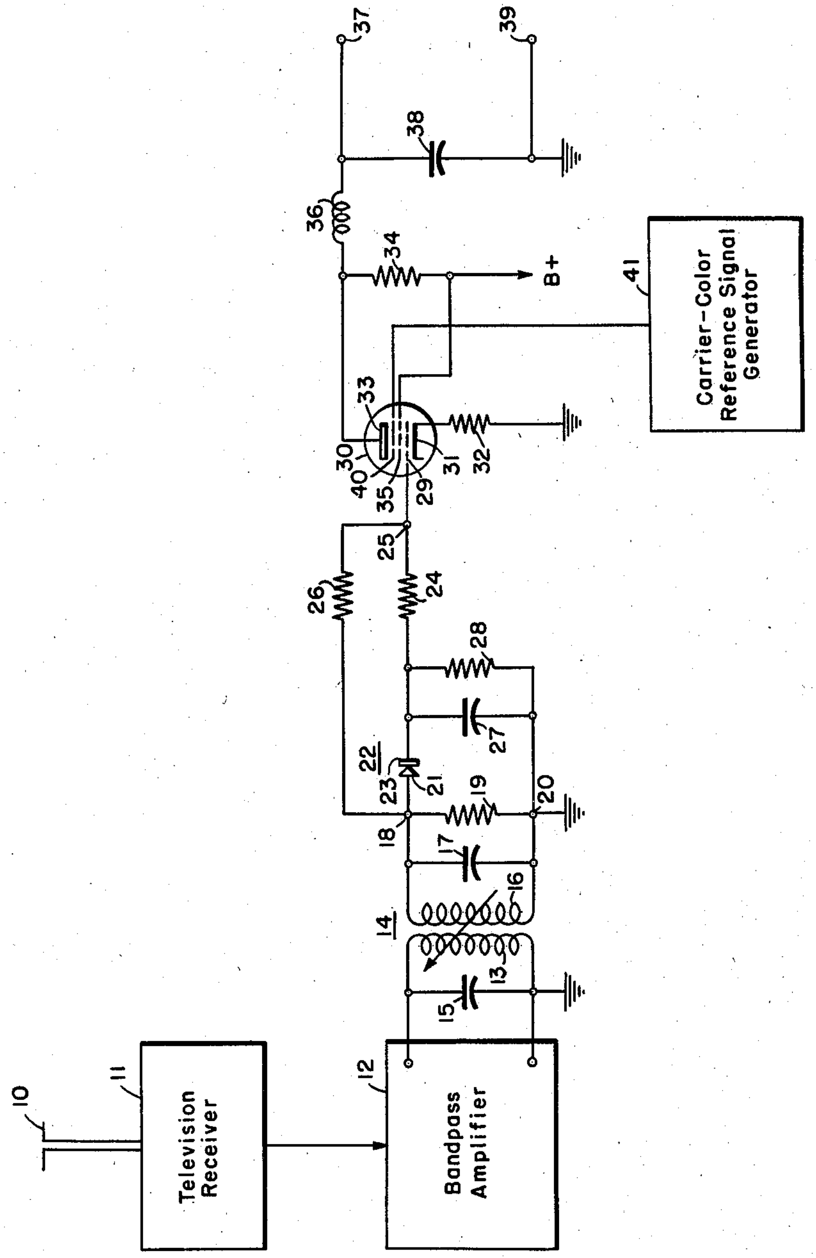
WITNESSES
Edwin E. Bassler
John J. Callahan
INVENTOR
Charles W. Baugh, Jr.
BY F. E. Browder
ATTORNEY 2,897,360

COLOR TELEVISION SYNCHRONOUS DEMODULATOR CIRCUIT

Charles W. Baugh, Jr., Montgomery Township, Somerset County, N.J., assignor to Westinghouse Electric Corporation, East Pittsburgh, Pa., a corporation of Pennsylvania Application August 17, 1955, Serial No. 529,008

4 Claims. (Cl. 250—27)

My invention relates to color television receiver apparatus, and more particularly to an improved demodulator circuit for a color television receiver apparatus.

In the National Television System Committee (hereinafter referred to as NTSC) color television system, the color co-ordinates employed are luminance, dominant wavelength, and spectral purity, which serve as measures of the subjective sensations of brightness, hue, and saturation, respectively. The luminance information is conveyed in the NTSC system by a monochrome signal, which is transmitted as a 4.0 megacycle signal modulated onto the picture carrier. The remaining two degrees of coloring information are transmitted by a chrominance or color signal, consisting of a subcarrier whose relative phase is determined by the dominant wavelength and whose amplitude is determined by the spectral purity of the color being transmitted. The chrominance subcarrier is situated 3.58 megacycles above the picture carrier. When the monochrome and chrominance signals are combined, the resulting signal is called the color picture signal.

In a color television receiver the chrominance or carrier color signal is separated from the monochrome signal and translated into color-difference signals, which can be used in conjunction with the monochrome signal to control the color output of a tricolor picture tube. This translation of the chrominance signal into color-difference signals is performed by what are called synchronous demodulators. The synchronous demodulator detects both the amplitude and the phase of the color subcarrier so that both hue and saturation information can be obtained from the modulated color subcarrier.

In the output of prior art synchronous demodulators used in NTSC color television receivers are signals representing chromatic distortion due to the rectification of the color subcarrier in addition to the desired color-difference signals. These signals representing chromatic distortion cause colorimetric errors in the reproduced color picture and cause difficulty in phasing color television receivers accurately.

One of the objects of the present invention, therefore, is to provide an improved color television receiver circuit which corrects and substantially eliminates the above-mentioned colorimetric errors.

It is a further object of this invention to improve the operation of particularly the synchronous demodulator circuit in a color television receiver.

It is an additional object of this invention to correct and substantially eliminate chromatic distortion arising in the synchronous demodulator tube of a color television receiver due to the action of the synchronous demodulator tube as a nonlinear amplifier.

It is a still further object of the present invention to provide an improved color television receiver synchronous demodulator circuit in which a greater output voltage can be obtained for a given quadrature cross talk percentage than the prior art color television receiver demodulator circuits.

Other objects and purposes of the present invention will become more apparent to those skilled in the art through a reading of the following descriptive specification, particularly when considered with the accompanying drawing which is a partial schematic and block diagram of a color television receiver apparatus showing a preferred circuit arrangement of the present invention.

With reference to the accompanying drawing, the color television receiver includes an antenna 10 to which is coupled, in a conventional manner, a television receiver 11. It will be understood that the receiver 11 may include such conventional apparatus as one or more carrier wave amplifiers, a frequency converter and a carrier wave demodulator or detector. Accordingly, by such means it will be understood that there may be derived from the receiver 11 composite color signals of the NTSC standard type.

A bandpass or chrominance amplifier 12 is coupled to the receiver 11. The output terminals of the bandpass amplifier 12 are connected to the primary winding 13 of a variable transformer 14, this winding being tuned by a capacitor 15. The secondary winding 16 of the transformer 14 is tuned by a capacitor 17 and has one terminal 18 which is connected through the resistor 19 to another terminal 20 which is connected to ground potential.

The terminal 18 is also connected to the anode 21 of a detector 22, the cathode 23 of which is connected through a resistor 24 to the terminal 25. The terminal 18 is also connected through a resistor 26 to the terminal 25.

The cathode 23 of the detector 22 is connected to ground potential through the capacitor 27 shunted by the resistor 28.

The terminal 25 is connected to the control grid 29 of an electron discharge device 30 which has a cathode electrode 31 connected to ground potential through the resistor 32. The electron discharge device 30 has an anode electrode 33 connected through a load resistor 34 to a source of positive potential B+. The device 30 has a screen electrode 35 connected to the source of positive potential B+. The anode electrode 33 is also connected through the inductor 36 to the output terminal 37 and through the series connected inductor 36 and capacitor 38 to the output terminal 39.

The electron discharge device 30 also has a suppressor electrode 40 which is connected to a carrier-color reference signal generator 41.

In operation, the composite color signal derived from the receiver 11 is applied to the bandpass amplifier 12 which passes the chrominance or carrier color signal while attenuating the monochrome signal. The carrier color signal is applied through the transformer 14 to the anode 21 of the detector 22. The carrier color signal appearing on the anode 21 of the detector 22 is demodulated by the detector 22 to supply the envelope of the carrier color signal through the resistor 24 to the terminal 25. The carrier color signal is also applied through the transformer 14 and the resistor 26 to the terminal 25.

The signal appearing at the terminal 25 which is a combination of the carrier color signal and the envelope of the carrier color signal is supplied to the control grid 29 of the detector 30.

As part of the NTSC composite color signal which is transmitted to the color receiver apparatus, there is a burst signal which is transmitted at a constant reference phase following each horizontal synchronizing pulse, and it is used in the color receiver apparatus to accurately control the apparatus of the carrier color reference signal generator 41 which feeds a 3.58 megacycle reference signal to the suppressor grid 40 of the synchronous demodulator or detector 30. The demodulator 30 detects both the amplitude and phase of the carrier color signal and the carrier color signal is translated into a color difference signal. Assuming that the demodulator 30 translates the carrier color signal into a red color difference signal, this latter signal may be combined with a blue color difference signal to derive a green color difference signal. The blue color difference signal may be obtained by the use of a demodulator circuit similar to that utilized for obtaining the red color difference signal, except that in this case a signal differing 90 degrees in phase from the reference signal obtained from the carrier color reference signal generator 41 would be applied to the suppressor grid of the blue color signal demodulator.

The red, green and blue color difference signals may be combined in a conventional manner with the monochrome portion of the composite color signal derived from the receiver 11 to produce red, green and blue color control signals which may be utilized to control the color output of a tricolor picture tube.

From the foregoing description of the operation of the present invention, it is seen that the signal applied to the control grid 29 of the demodulator 30 is a combination of the carrier color signal and the envelope of the carrier color signal. The latter signal effectively cancels the distortion produced due to the action of the demodulator tube as a nonlinear amplifier.

While the present invention has been shown in a preferred embodiment, wherein a pentode was employed as the synchronous demodulator, it should be obvious to those skilled in the art that this invention is not so limited but is susceptible of various other changes and modifications without departing from the spirit thereof.

I claim as my invention:

1. In a color television system wherein color signals are represented by the amplitude of a color carrier at a plurality of phase angles, a circuit for recovering a color signal represented by the amplitude variations of the color carrier comprising in combination, a source of waves including a modulated carrier color signal, demodulation means coupled to said source for operating on a portion of said modulated carrier signal to derive a signal having substantially the amplitude characteristics of the modulation envelope, a source of color carrier reference corresponding to one of said phase angles, and a synchronous modulator coupled to said sources and said demodulation means so as to modulate said color carrier reference in accordance with said carrier color signal and said derived signal.

2. In color television receiver apparatus, means for recovering a color signal represented by the amplitude variations of a color subcarrier comprising in combination, a source of carrier color signal, a source of carrier color reference signal, a synchronous demodulator circuit having a plurality of inputs, means including a detector connecting said source of carrier color signal to one of said inputs of said demodulator circuit for applying to said one input said carrier color signal and said detected carrier color signal, and means connecting said source of carrier color reference signal to another input of said demodulator circuit.

3. In color television receiver apparatus, means for recovering a color signal represented by the amplitude variations of a color subcarrier comprising in combination, a source of carrier color signal, a source of carrier color reference signal, a synchronous demodulator circuit comprising an electron discharge device having an anode, a cathode, a control grid, a screen grid and a suppressor grid, means including a detector connecting said source of carrier color signal between the cathode and control grid of said electron discharge device for applying to said control control grid said carrier color signal and a signal corresponding to said amplitude variations, and means connecting said source of carrier color reference between said cathode and another one of said grids.

4. In color television receiver apparatus, means for recovering a color signal represented by the amplitude variations of a color subcarrier comprising in combination, a source of carrier color signal, a source of carrier color reference signal, a synchronous demodulator circuit comprising an electron discharge device having a plurality of inputs, first means connecting said source of carrier color signal to one of the inputs of the demodulator circuit, second means including means for developing a signal representative of the envelope of said carrier color signal for applying said last-named signal to said one input of the demodulator circuit, and means connecting said source of carrier color reference signal to another input of the demodulator circuit.

References Cited in the file of this patent

UNITED STATES PATENTS

| | | |
|---|---|---|
| 2,605,397 | Cheek | July 29, 1952 |
| 2,635,184 | Cotsworth | Apr. 14, 1953 |
| 2,731,558 | Anthun | Jan. 17, 1956 |
| 2,744,155 | Kihn | May 1, 1956 |
| 2,757,229 | Larky | July 31, 1956 |
| 2,779,818 | Adler et al. | Jan. 29, 1957 |